United States Patent Office 3,129,953
Patented Apr. 21, 1964

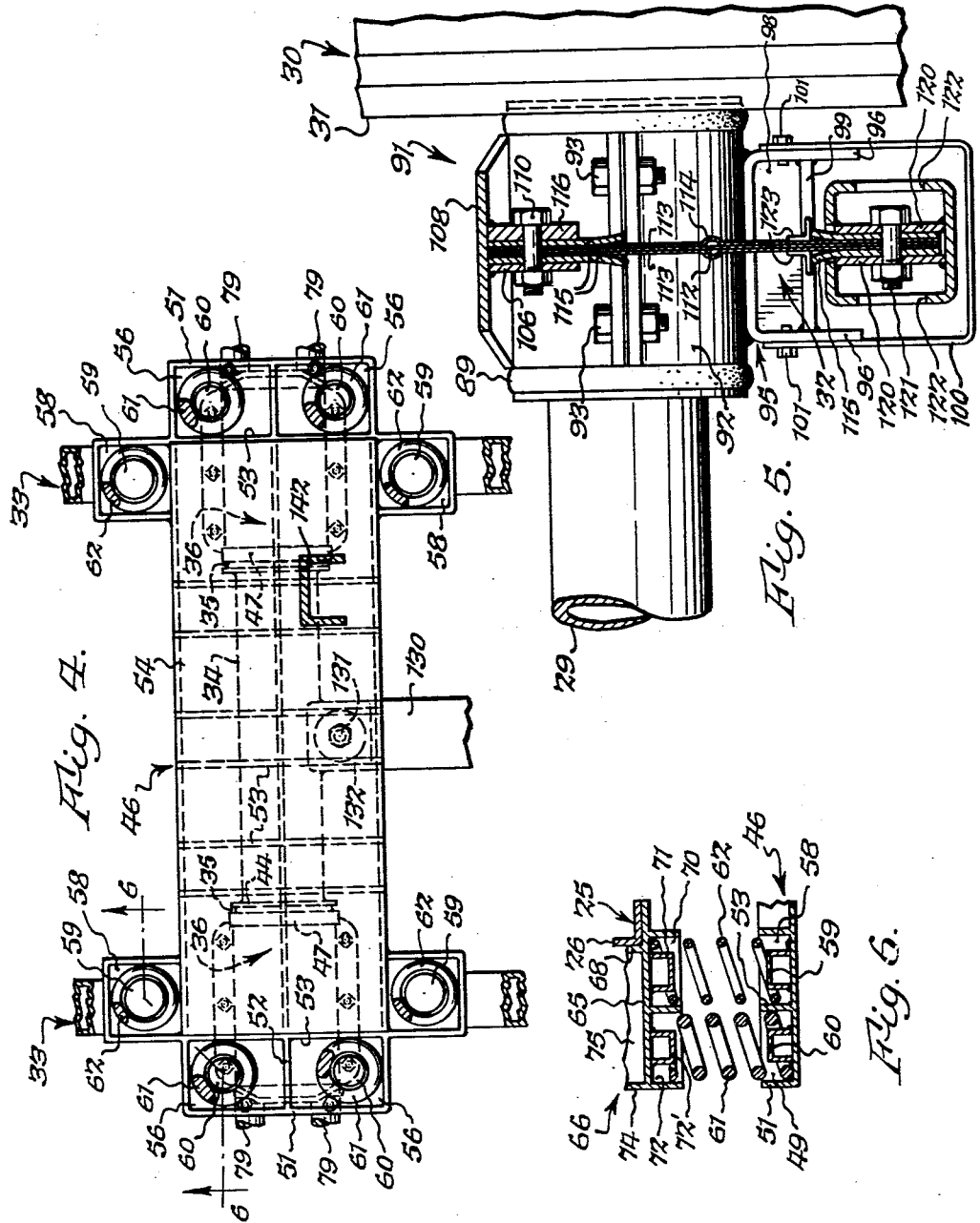

3,129,953
TANDEM AXLE SPRING SUSPENSION
Albert F. Hickman, Eden, N.Y.
Filed Feb. 23, 1961, Ser. No. 91,101
2 Claims. (Cl. 280—104.5)

This invention relates to a tandem axle spring suspension for trucks, trailers and passenger buses and more particularly to such a suspension in which the vertical resilience is provided by helical metal compression springs.

This application is an improvement on the tandem axle suspension described and claimed in my copending application Serial No. 25,445, filed April 28, 1960, now Patent 3,069,184, dated December 18, 1962, for Spring Suspension for Tandem Axle Vehicles.

In common with said copending application an important general object of the present invention is to provide a tandem axle suspension which is adapted for heavy duty trucks having wide bodies and dual tires with only a few inches of space between the body and the innermost of the dual tires, and is also adapted for heavy duty trucks with a so-called extended wheel base tandem suspension, such extended wheel base tandem axles being required to carry maximum loads in certain States and having a wheel base increased from the usual 53 inches to 96 inches.

Another general object in common with said application is to provide such a suspension which will permit the large amount of vertical axle movement required for highway vehicles to provide a vertical ride as soft as load heights will allow and at a low frequency.

Another general object is to provide such a helical compression spring suspension which is substantially free from friction but is controlled by an increased resistance to motion in proportion to the amplitude and velocity of vertical frame movement.

Another general object is to provide such a helical compression spring suspension in which lateral and vertical movement of the unsprung components, as well as a slight movement thereof lengthwise of the vehicle frame, are permitted and resiliently resisted, the lateral and vertical resilience being sufficient, both when the vehicle is loaded and unloaded, to absorb thrust of the axles laterally of the frame, particularly resulting from one wheel moving up and down relative to the others, thereby to provide increased safety, tire and gasoline mileage and stability.

Another general object is to provide a gearless compensating means connecting the companion ends of the tandem axles and through which excess load on one wheel is transmitted to its companion wheel on the same side of the vehicle.

Another general object is to provide such a spring suspension consisting of compact units which are arranged so as not to interfere with the frame, axle and wheel movement and in which the moving parts are arranged immediately inside and close to the wheels and are high to provide high and wide support for the body on the axles with resulting increased stability.

Another general object is to provide such a tandem axle suspension in which the tandem axles are self-steering so that in rounding a curve the axles automatically assume such position relative to each other as will enable a pure rolling action to be obtained. This object is also achieved on the straightaway when some unbalance, such as one tire being of greater diameter, tends to cause tire scuffing.

Another general object is to provide such a suspension in which the vertical resilience is provided by helical compression springs and which suspension can be removed and replaced, with the axles, walking beams and wheels as a unit, so that field repairs can be avoided and the hold up of trucks for repairs of their suspensions can be reduced to a minimum.

Another general object is to provide such a tandem axle suspension and which can have softer springs than those now on the market for equivalent duty and at the same time have greater sidesway control through high and wide spring mountings.

Another general aim is to provide reduced height change of the body from the ground, from empty to loaded, preferably keeping this change to about two inches, and at the same time providing a soft, low frequency ride with improved stability and sidesway control.

Another general object is to provide such a suspension which can have many years and hundreds of thousands of miles of carefree operation without repairs or servicing.

Other important general object are to provide such a suspension which is low in both initial cost and upkeep; which renders auxiliary devices for the control of sidesway unnecessary; and in which periodic vibration of the suspension is dampened out.

A specific object of the present invention is to provide such a suspension in which all bearings, other than the wheel bearings can be in the form of rubber bodies, such as bushings or cushions, which are distorted to provide the required movement of the connected parts, such bearings being free from lubrication or service requirements and being reliable for many years of carefree service.

Another specific object of the invention is to provide such rubber bushed bearings for the walking beams of the suspension which are low in cost and in which the rubber is confined in such manner as to give optimum performance with maximum life. Such rubber bushings also permit limited lateral movement of the ends of the walking beams but at the same time yieldingly return the walking beams to centered position.

Another specific object of the invention is to provide, in combination with such rubber bushed bearings for the walking beams, positive or metal-to-metal stops limiting axial displacement of the walking beams.

Another specific object of the invention is to provide such a suspension which is light in weight, particularly in unsprung weight, this being principally achieved by a cross rod structure supported by the walking beams and being in the form of a light weight bolster which incorporates the strength of the cross rod on which the walking beams are journalled and also provides the widely spaced, high spring seats for the vertically disposed helical compression springs which provide the vertical resiliency as well as mounting for shock absorbers and radius rods which confine the frame to substantially vertical movement with reference to the bolster.

Another specific object of the invention is to provide means retaining the axle ends in position with reference to the walking beams even though the shackles connecting these parts should break.

Another specific object is to provide shock absorber mountings which are readily accessible and do not add materially to the cost of the suspension.

Other objects and advantages of the invention will be apparent from the following description and drawings in which:

FIG. 4 is a fragmentary horizontal section taken generally along line 4—4, FIG. 3.

FIG. 5 is an enlarged fragmentary vertical section taken generally along line 5—5, FIG. 1.

FIG. 6 is a vertical section taken generally along line 6—6, FIG. 4, the parts being shown in empty body position.

Figure 1:
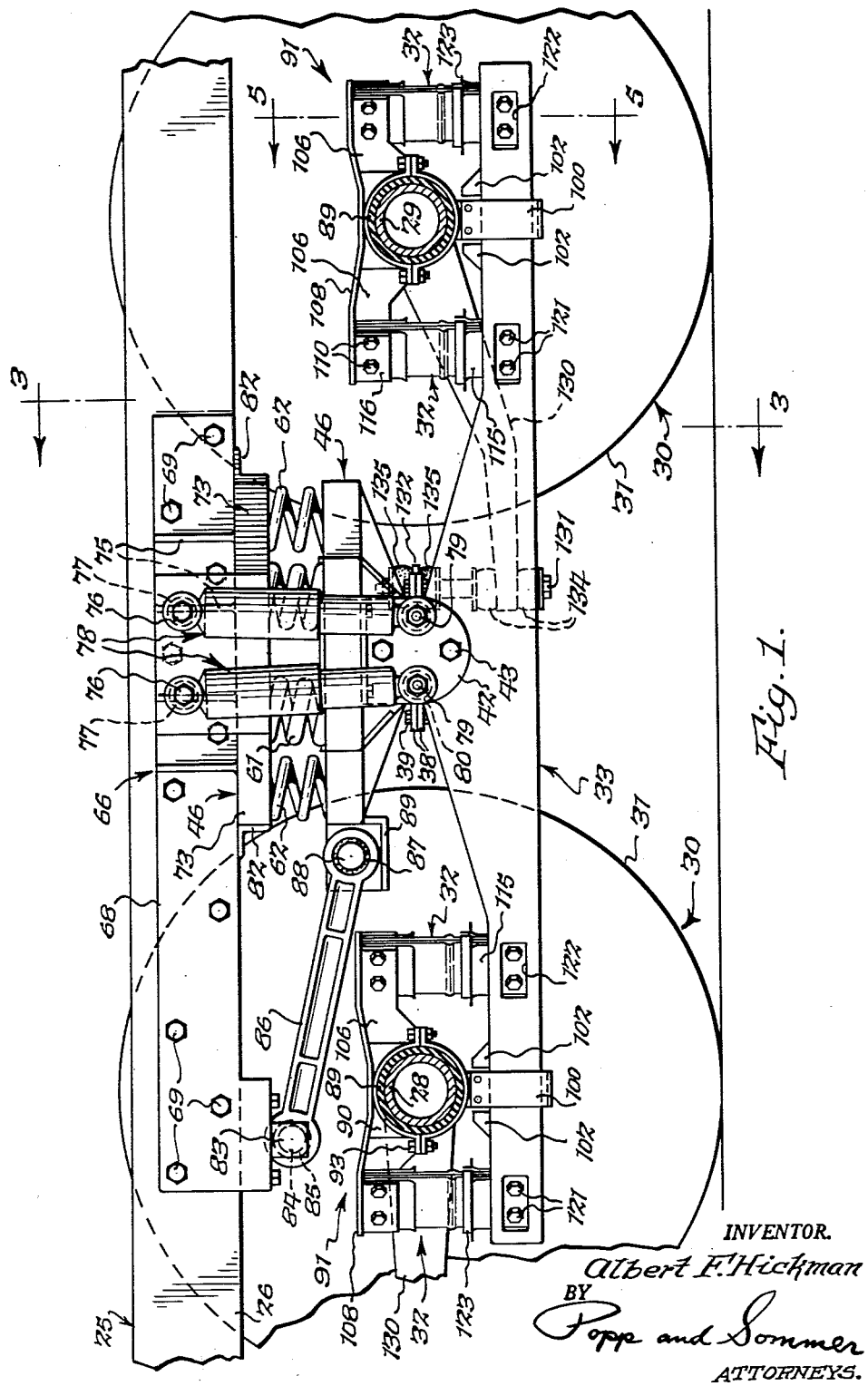
FIG. 1 is a fragmentary side elevation of the rear end of a tandem axle vehicle having a suspension embodying the present invention, the axles being shown in section and the section being taken generally along line 1—1, FIG. 2 and the parts being shown in a semi-loaded position with the heavy duty, second stage helical compression springs just coming into service.

The invention is illustrated as being in the form of a heavy duty tandem axle suspension for wide bodied, large tired trucks or trailers. As to such wide bodied, large tired trucks, present road laws limit the maximum overall width of highway trucks to 96 inches. Heavy duty trucks have a frame width of 34 inches and with 11 inch spaced dual tires, this leaves only 5 to 6 inches between the tires and each side of the frame to accommodate the suspension and with the present invention space must be provided to contain two stages of large vertical helical compression springs to support the load, and provision must also be made to accommodate a substantial lateral axle movement, that is, at least one inch of axle movement lengthwise of their axes in either direction.

The main frame 25 of the vehicle can be of any suitable construction and is shown as comprising a pair of main longitudinal side frame bars in the form of inwardly opening channels 26 which are shown as straight and parallel and are connected by the usual cross bars (not shown). The frame is shown as supported by a pair of tandem axles 28, 29 which in turn are supported by wheels 30, these wheels being rotatably secured on these axles and each includes a rubber tire 31. One or both groups can be drive wheels, the axle 28 being the front axle and the axle 29 being the trailing axle.

The construction of the tandem axle spring suspension at the left hand side of the truck is substantially the same as the tandem axle spring suspension at the right hand side of the truck and hence a description of the spring suspension at one side of the truck will be deemed to apply to both sides, the same reference numerals being used.

Each end of each of the axles 28, 29 is connected by leaf spring shackles, indicated generally at 32, to one end of a horizontal walking beam 33, these leaf spring shackles being arranged adjacent the inner faces of the tires 31 of the innermost wheels 30 aand the walking beams in part being arranged under the corresponding longitudinal side frame bars 26.

Figure 3:
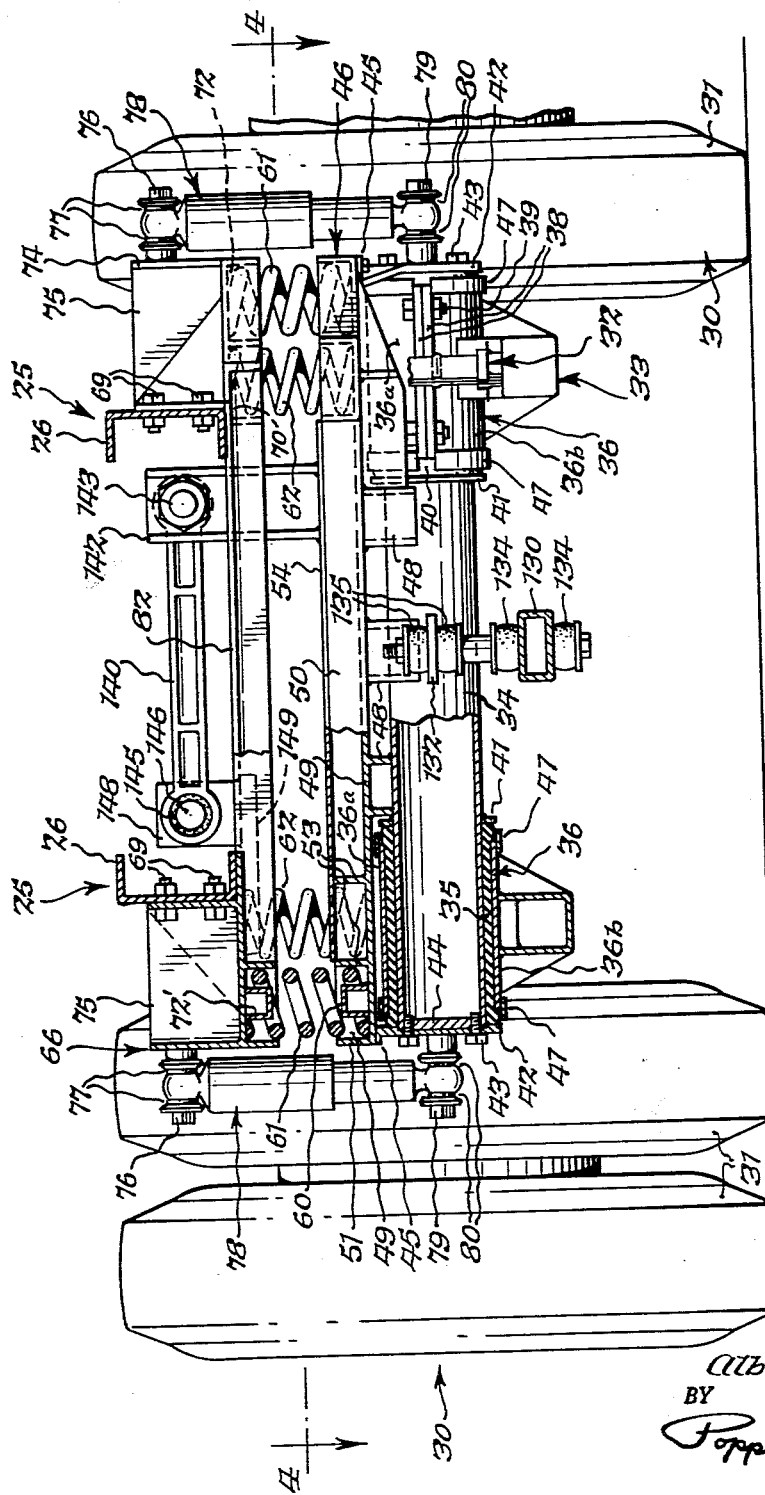
FIG. 3 is a fragmentary vertical transverse section taken generally along line 3—3, FIG. 1, the parts again being shown in a semi-loaded position.

Each walking beam 33 is preferably of tubular, box form in vertical cross section having vertical side walls and horizontal top and bottom walls as best shown in FIGS. 3, 4 and 5. The central part of each walking beam preferably arches or projects upwardly and is journalled on a cross rod or tube 34 by means of a rubber bushed bearing, the rubber bushing 35 of which is under compression and is of substantial thickness to be twisted torsionally as a part of the bearing movement in yieldingly permitting the necessary rocking movement of the walking beam. Each rubber bushing 35 embraces the corresponding end of the cross rod or tube 34 and is held in compressive relation therewith by the semicylindrical halves 36a and 36b of a two-piece rock sleeve 36. The two halves 36a and 36b of each rock sleeve have axially extending outwardly projecting flanges 38 which are drawn together by bolts 39 to provide the desired degree of compression of the rubber bushing 35. The lower half 36b of the sleeve 36 is suitably welded in the crest of the upwardly projecting central part of the tubular walking beam 33 so that each rock sleeve 36 is fixed to its walking beam 33.

To permit the flow of rubber necessarily resulting from the movement of the walking beams 33, as well as to accommodate the rubber displaced in tightening the bolts 39 to obtain the required precompression of the rubber bushings 35, the ends 40 of the rubber bushings project beyond the ends of the two part rock sleeves 36 and normally are somewhat enlarged or bulging as shown.

Each walking beam 33 is held against inward axial displacement along the cross tube 34 by an abutment ring or collar 41 surrounding and welded to the cross tube 34, and each walking beam 33 is held against outward axial displacement from the cross tube 34 by a vertical abutment end plate 42 secured to the corresponding end of the cross tube by screws 43 which are anchored in a plug or end head 44 welded in each end of the cross tube as best shown in FIG. 3.

A feature of the invention resides in the provision of positive or metal-to-metal limit stops restricting the horizontal movement of each walking beam lengthwise of the cross tube 34 while at the same time permitting cushioned self returning, lateral movement of the ends of the walking beam up to the point of engagement of the metal-to-metal stops. To provide a positive metal-to-metal stop for such axial movement a metal half ring 47 is welded around each end of both the lower half 36b and upper half 36a of each rock sleeve 36 so as to provide semicircular extensions which surround and are normally out of contact with the enlarged ends 40 of the rubber bushings 35. These welded end half rings are also normally in spaced relation to the abutment rings or collars 41 welded to the cross tube 34 and to the abutment end plates 42 secured to the ends of this cross tube. However, these end half rings 47 act as positive stops to limit the horizontal movement of the walking beams 33 lengthwise of the cross tubes 34, these half rings engaging and having metal-to-metal contact with the abutment rings or collars 41 or the abutment end plates 42 of the cross tube 43 for this purpose. At the same time, these half rings 47 do not interfere with a slight universal bearing action of the rubber bushings 35 in permitting a limited lateral movement of the ends of the walking beams but returning these ends to centered position when the forces causing such slight lateral movement of the walking beam ends cease.

The upper horizontal edge of each end plate 42 of the cross tube 34 is horizontally flanged, as indicated at 45, to support the corresponding end of a bolster which forms part of vertically movable cross structure and is indicated generally at 46 and which forms an important feature of the present invention. In addition to the support by the end plates 45, this bolster 46 is supported at its center by a plurality of brackets 48 which are welded to the top of the cross tube 34 and also to the underside of the bolster. This underside of the bolster comprises a bottom plate 49 of rectangular form in plan and having longitudinal side walls 50 rising from its opposite longitudinal side edges and end walls 51 rising from its end edges. A longitudinal upstanding internal reinforcing rib 52 extends centrally along the bottom plate 49 and between the end walls 51 and at intervals upstanding cross ribs 53 connect the side walls 50 with the central longitudinal rib 52. A top plate 54 is welded to the top edges of the side walls 50 but this top plate 54 is shorter than the bottom plate 49 so as to leave two upwardly opening end pockets or spring seats 56 at each end of the bolster each of these pockets being formed by the bottom plate 49, end wall 51, side wall 50, central longitudinal reinforcing rib 52 and the corresponding one of the cross ribs 53. In addition, upwardly opening pockets 58 are welded to each corner of the vertically movable bolster 46 to project horizontally and laterally therefrom, these pockets 58 being arranged over the walking beams 33 as best shown in FIG. 4.

Each of the pockets 58 has an upstanding inverted cup-shaped stud or boss 59 of relatively large size welded in its center and each of the pockets 56 has a similar stud or boss 60 of smaller diameter welded near its center for a purpose which will presently appear.

Each of the end pockets 56 of the bolster 46 supports a relatively heavy helical compression spring 61 the lower convolution of which fits around and is centered by the corresponding stud or boss 60 welded in each of these pockets. Each of the side pockets 58 supports a light duty helical compression spring 62 the bottom convolution of which fits around and is centered by the stud or boss 59 welded in each of these pockets. It will be noted from an inspection of FIG. 6 that in an unstressed condition the pair of light duty springs 62 are longer than the pair of heavy duty springs 61, this being for the purpose of supporting the truck frame only on the light duty springs 62 when the truck is travelling along without a load, and to cut the heavy duty springs 61 into service only when the truck is loaded.

Figure 2:
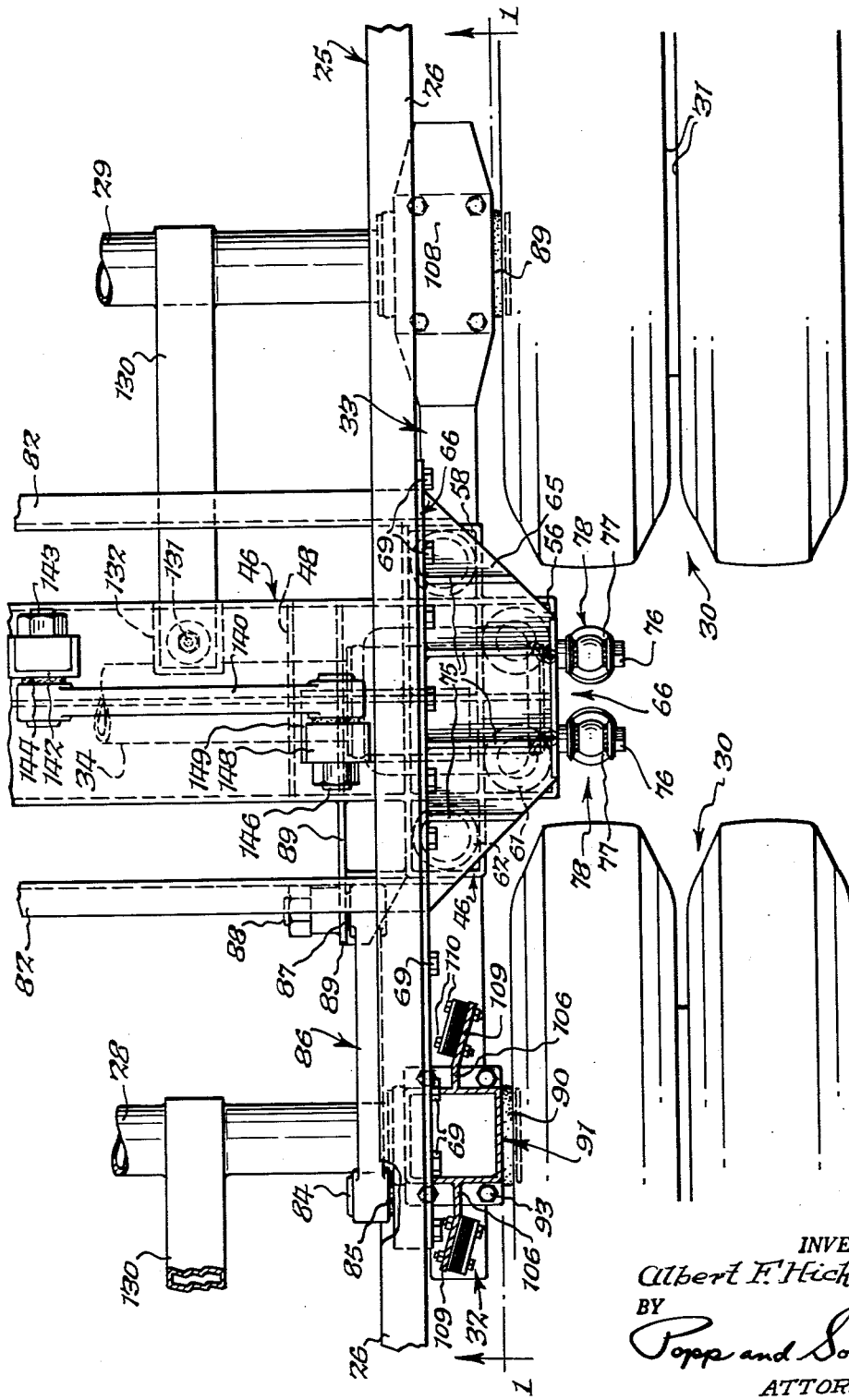
FIGURE 2 is a fragmentary top plan view, partly in section, of one side of the suspension shown in FIG. 1, the other side of the suspension being of substantially identical construction.

For this purpose the upper ends of the light duty springs 62 are in constant contact with the underside of a horizontal bottom plate 65 of a frame bracket indicated generally at 66, this bottom plate 65 extending under the adjacent main longitudinal side frame bar 26 of the vehicle frame and being welded to the lower edge of a vertical attaching plate 68 which is arranged along the outer face of the corresponding main longitudinal side frame bar 26 and removably secured thereto by bolts 69. The upper ends of the pair of relatively light helical compression springs 62 fit in downwardly opening pockets 70 at the front and rear extremities of the horizontal plate 65 and are held in centered relation therein by a depending stud or boss 71 welded in the center of each of these pockets 70. The upper ends of the heavy duty helical compression springs 61 are arranged in downwardly opening pockets 72 having bosses 72′ which are arranged side by side intermediate the light duty helical compression springs 62 but in further outboard relation to the vehicle frame as best shown in FIG. 2. As shown in this figure the end edges 73 of the horizontal bottom plate 65 are inclined so as to provide adequate clearance for the tires 31 of the wheels 30.

Each horizontal bottom plate 65 carries an outer vertical end wall or plate 74 which is shown as reinforced by webs or ribs 75 rising and connected to the horizontal bottom plate 65 and connecting the outer end wall 74 with the vertical attaching plate 68 of the frame bracket. To the outer vertical side plates 74 of each frame bracket 66 is pivotally secured, by a pivot pin 76 and surrounding rubber bushing 77, one end of a telescopic hydraulic shock absorber 78, the lower end of which is pivoted, by a pivot pin 79 and surrounding rubber bushing 80, to the end plate 42 of the cross tube 34. These hydraulic shock absorbers 78 are of the single acting type, offering no substantial impedance to the upward movement of the bolster 46 toward the vehicle frame 25 but imposing substantial resistance to the downward or rebound movement of this bolster relative to the vehicle frame.

On opposite sides of the horizontal bottom plate 65 the vertical attaching plates 68 of the frame brackets 66 on opposite sides of the vehicle are connected by angle irons 82, these angle bars serving to prevent spreading of the frame brackets, and hence the main longitudinal side frame bars 26, under operating conditions.

The vertical attaching plate 68 of each frame bracket 66 extends a substantial distance forwardly from the horizontal bottom plate 65, and at its extreme forward end is provided with a depending portion 83 carrying a horizontal pivot pin 84 which projects horizontally inwardly parallel with the axles 28 and 29 and is arranged under the frame 25. Each pin 84 carries a rubber bushing 85 on which is journalled the knuckle of a radius rod 86, each of these radius rods extending toward the rear of the vehicle and having its other end pivotally secured to a rubber bushing 87 surrounding a horizontal pivot pin 88 mounted on and projecting from a horizontal forward extension or bracket 89 of the corresponding end of the bolster 46. The rubber bushings 85 and 87 interposed between these pins 84 and 88 and the ends of the radius rods 86 avoid the necessity for lubrication at these bearings points. It will be seen that the radius rods 86 prevent any substantial movement of the bolster 46 longitudinally of the vehicle frame while at the same time permitting free vertical movement thereof relative to the vehicle frame.

Each axle end is embraced by a rubber sleeve 89 of substantial thickness. Each of these rubber sleeves is embraced by the semicylindrical bottom face of the central body part 90 of an axle bracket 91 and by a companion semicylindrical metal clamping member 92. The metal clamping member can be secured to the axle bracket 91 by bolts 93 which serve to draw each axle bracket and its semicylindrical clamping member into compressive relation with the rubber bushing 89 to hold the axle bracket 91 against rotation relative to its axle end except to the limited degree permitted by the torsional twisting of the rubber sleeve 89. Each clamping member 92 also has a downwardly opening U-shaped yoke or bracket 95 welded to its underside, the downwardly projecting end walls or ears 96 of this yoke or bracket being in line with each other transversely of the vehicle frame as best shown in FIG. 5. A short T-bar 98 has its ends welded to the inner faces of these ears 96 and with its flanges 99 horizontally disposed close to the upper face of the walking beam 33. A U-shaped strap 100 has its ends bolted, as indicated at 101, to the ears 96 so that this strap encircles the underside of the walking beam end, the purpose of this strap being to provide an emergency support for the walking beam end from the axle bracket 91 in the event of breakage of the spring shackles 32. Also to prevent displacement of the end of either axle 28 or 29 lengthwise of the walking beam 33 in the event of such spring shackle breakage, upright fins or stop plates 102 are welded to the top face of each walking beam at each end thereof in closely spaced relation to the bottom flanges 99 of the corresponding T-bar 98.

The central body part 90 of each axle bracket 91 is of rectangular box-like form in horizontal section as shown at the left of FIG. 2 and has opposite arms projecting fore-and-aft with reference to the vehicle. Each arm is T-shaped in cross section, having a vertical web 106 and a top plate 108, the latter extending over both arms as well as the box-like central part 90. The outer extremity 109 of each vertical web 106 is angularly disposed to toe in or converge toward the front and center of the vehicle. To one face of each toed-in end 109 of each vertical web 106 is secured, as by bolts 110, the upper end of a corresponding leaf spring shackle 32, these leaf spring shackles thereby also toeing in or converging toward the front and center of the vehicle.

Each of the leaf spring shackles 32 is shown as comprising a flat central spring leaf 112 flanked by a pair of full length spring leaves 113 each of which is shown as having an outwardly protruding corrugation 114 at its center. These leaves 113 are in turn flanked at each end by a pair of shorter spring leaves 115 which preferably diverge from each other toward the center of the shackle. The bolts 110 extend through the upper ends of the leaves 112, 113 and 115 and a clamping plate 116 and anchor in the toed-in extremities 109 of the vertical webs 106 of the axle brackets. The upper edge of each clamping plate 116 is shown as welded to the underside of the top plate 108 as illustrated in FIG. 5.

The lower end of each shackle 32 extends through a hole in the top wall of the walking beam 33 into the interior thereof and fits between a pair of vertically spaced webs 120 welded in each end of each walking beam and extending lengthwise thereof. Bolts 121 extend through and clamp the lower ends of the leaves 112, 113 and 115 between the webs 120, access to these bolts being had through access holes 122 in the sides of the walking beam. Small angles 123 can be secured to each shackle, preferably in clamping relation thereto, above the divergent ends of the outer leaves 115 to prevent solids from filling the crevice produced by their diverging upper ends.

The transverse corrugations or offsets 114 at the centers of the leaves 113 flank the center leaf 112 to accommodate the situation where one of the four dual wheels 30 rises relative to the other three. Thus, if there were only lateral movement of the leaf spring shackles 32 transversely of the plane of the center leaf 112, the flanking leaves 113 could be straight and the corrugations 114 would be unnecessary. However, when one dual wheel 30 and its axle end rises relative to the other three, one flanking leaf 113 is placed under tension and the other placed under compression and corresponding elongation and shortening of these leaves 113 relative to each other must take place. This is permitted by the corrugations 114. These two flanking spring leaves 113 are fully effective in resisting forces which are fore-and-aft with respect to the vehicle and are also fully effective if the center leaf 112 should break.

The suspension is also shown as including axle torque arms 130 which are effective against brake and drive torque reactions. Each torque arm 130 is welded to the corresponding axle 28 and 29 near the center thereof to project horizontally toward the front end of the vehicle. The torque arm 130 of the rear tandem axle 29 can be connected by a vertical rod 131 to the bolster 46, this bolster having welded thereto for this purpose a bracket 132 which includes a rearwardly projecting tongue through which the rod 131 extends. Preferably the vertical force of this torque arm is transmitted through a pair of rubber cushions 134 to the rod 131 and the vertical force of this rod is delivered to the bracket 132 through a pair of rubber cushions 135.

The outboard end of the forward torque arm 130 can be pivotally connected to the frame 25 in the same manner (not shown).

The coil springs 61 and 62 do not materially restrict movement of the unsprung portion of the suspension, including the bolster 46, walking beams 33 and cross shaft 34, transversely of the vehicle. To provide a cushioned resistance to such movement a radius rod 140 is arranged above and parallel with the bolster 46 and cross tube 34. This radius rod is pivotally secured to the upper end of an upstanding bracket 142 fixed to and rising from the top plate 68 of the bolster 46, this pivotal connection being through a horizontal pivot pin 143 extending fore-and-aft of the vehicle and surrounded by a rubber bushing 144 and embraced by the knuckle of the radius rod 140. The opposite end of this radius rod 140 is secured through a rubber bushing 145 and pivot pin 146 with a bracket 148 mounted on a plate 149 welded to and projecting horizontally from the underside of one of the frame brackets 66. The horizontal force transmitted by the radius rod 140 is cushioned by the rubber bushings 144 and 145.

*Operation*

In the operation of the suspension, the upward movement of one end of, say the front tandem axle 28, effects upward movement of the double armed bracket 91 fixed thereon thereby to place the corresponding pair of leaf spring shackles 32 under tension to effect upward movement of the front end of the corresponding walking beam 33. This force through the leaf spring shackles is essentially transmitted through the center leaf 112 thereof. The corrugations 114 in the leaves 113 which flank the central spring leaf 112 permit the required elongation of one leaf 113 and shortening of the other leaf 113 when one axle end rises relative to the other axle ends which is the condition assumed in this description of the operation.

This upward movement of the forward end of one walking beam 33 raises its rock sleeve 36 (FIG. 3) at the center of the walking beam and which is journalled through the rubber bushing 35 on the corresponding end of the cross tube 34. This rubber bushing is of sufficient radial thickness to permit the required rocking of the walking beam 33 and provides a frictionless bearing which is free from lubrication requirements. The two rubber bushings 35 hold the walking beams at the outer ends of the cross tube 34 but in the event of extreme lateral forces against the vehicle body, the semicircular stop plates or half rings 44 welded to and projecting axially outwardly from the opposite ends of each of the rock sleeves 36 engage the rings 41 and end plates 42 fixed to the cross tube 34 so as to provide a positive metal-to-metal stop under such extreme condition. These half rings also permit a limited amount of transverse movement of the ends of the walking beams but engage the rings 41 and end plates 42 to prevent any such movement to excess.

This upward movement of one end of the cross tube 34 raises the corresponding end of the bolster 46 supported by and fixed to this cross tube via these end plates 42 and also the welded central brackets 48. Assuming that the chassis is unloaded, at this time the heavy or central pair of helical compression springs 61 on the bolster 46 are not in contact with the underside of the frame bracket 66. Accordingly, in this upward movement of one end of the bolster 46, no force is transmitted through these heavy or central pair of compression springs 61 and they are merely moved toward contact with the underside of the horizontal bottom plate 65 of the frame bracket 66, being guided in this movement by the depending studs or bosses 73 in the pockets 72 containing the upper ends of these heavy duty helical compression springs.

Accordingly the force resulting from the upward movement of one end of the bolster 46 is transmitted through the light or outermost pair, lengthwise of the vehicle, of helical compression springs 62 to the underside of the frame bracket 66. These relatively light helical compression springs 62 are, of course, compressed during this action and provide resilient support for the unloaded truck to provide a first stage of resilient resistance through relatively light springs which provide the desired low frequency and action for the empty truck.

In this action the one-way shock absorbers 78 are effective to retard rebound or downward movement only of the bolster 46 with reference to the frame 25. Thus the shock absorbers freely permit compression of the relatively light helical compression springs 62 but retard the rebound action of these springs. It will be noted that these shock absorbers are interposed directly between each frame bracket 66 and the end plate 42 of the cross tube 34 so as to be directly accessible for inspection and at the same time not interfering with the movement of the dual wheels 30 or their tires 31.

Assuming that the truck is then loaded, or that the assumed upward movement of the one end of the front axle 28 is of sufficient magnitude, the upward movement of the corresponding end of the cross tube 34 and bolster 46 will cause the upper ends of the heavy duty or central pair of helical compression springs 61 to engage and transmit force to the frame bracket 66. Accordingly, the loaded chassis 25 is now resiliently supported by the second stage of heavier helical compression springs 61 in addition to the lighter first stage of helical compression springs 62 to provide the required increased resilient resistance for adequate support of the load on the axles. The size and strength of the helical compression springs 61 and 62 are selected to provide the spring rate and amplitude of movement best suited to the empty vehicle and to the load to be carried by the vehicle.

It will be noted that this action of the suspension is friction free, the forces being transmitted to the walking beams via the leaf spring shackles; the force from each walking beam 33 being transmitted to the cross shaft 34 via the rubber bushing 35; and the force from the bolster 46 being transmitted to the frame bracket 66 via the helical compression springs. Further the ends of the shock absorbers are connected through rubber bushings 80 and 77 to the frame brackets 66 and end plates 42 of the cross tube 34, respectively, to avoid friction in these points, and rubber bodies are provided for the other required torque arms and radius rod for the suspension.

Lateral cushioning of the axles 28, 29 is provided by the leaf spring shackles 32. Thus either axle can move lengthwise of its axis, this being permitted by the leaves of these leaf spring shackles, and these leaf spring shackles yieldingly return the chassis 25 to centered relationship to the axles when normal conditions are restored. It will be noted that since the leaf spring shackles 32 are between the axles and the walking beams, there is minimum inertia resistance to such lateral movement of the axles, the only inertia being that of the individual axles themselves. The amount of such lateral movement of each axle is positively limited. Thus, excessive movement of either axle lengthwise of its axis will cause the depending ears 96 of its inverted U-shaped bracket 95 (FIG. 5) to engage the corresponding walking beam 33. The tires are thereby prevented from being cut by contacting any part of the suspension.

As with my said copending application, the axles are also self-steering, that is, they move laterally to trail the steering wheels and to trail each other as the vehicle is steering around curves and in and out of traffic. This self-steering is obtained through the angularity, in a horizontal direction, of the leaf spring shackles 32. Thus, as best shown in FIG. 2, the leaves of these leaf spring shackles toe in or converge toward the front of the vehicle, the leaves of the leaf spring shackles at each side of the vehicle being parallel.

When the vehicle makes a turn in the road, the tires of each of the axles 28, 29 tend to resist the scuffing which would otherwise occur and in doing so push each axle laterally of the frame to eliminate scuffing. Confining attention to the front axle 28, this lateral or axial movement on making a turn displaces the upper ends of the four pairs of leaf spring shackles 32 horizontally, these leaf spring shackles at one side of the vehicle being displaced horizontally toward the frame 25 and at the other side of the vehicle being displaced away from the frame. Since these shackles 32 are set at an angle and since the shackles at opposite sides of the vehicle are set at opposite angles in a horizontal direction so that the leaves of all the shackles toe in toward the front of the vehicle, it will be seen that such an assumed lateral movement of the front axle 28 causes one of its ends to be displaced forwardly and its other end to be displaced rearwardly.

It will therefore be seen that such endwise displacement of each tandem axle 28, 29 will cause a corresponding opposite displacement, fore-and-aft of the frame, of the opposite ends thereof. This fore-and-aft displacement of the two tandem axles 28, 29 is such that in rounding a curve and with such endwise displacement of the axles 28, 29 to avoid tire scuffing, both of the tandem axles are caused to steer in the direction corresponding to the turn being made by the vehicle. Thus, when the vehicle is steered to the right, the front end of the frame 25 moves about a theoretical pivot intermediate the tandem axles. This causes a lateral movement of the body in opposite directions relative to the two tandem axles, the body movement being to the right relative to the front tandem axle 28 and the left relative to the rear tandem axle 29. This causes the left hand end of the front tandem axle 28 to move forwardly and the right hand end of this front tandem axle to move rearwardly. This also causes the left hand end of the rear tandem axle 29 to move rearwardly and the right hand end of the rear tandem axle to move forwardly. The movement therefore tends to bring the axes of the tandem axles 28, 29 so as to intersect the axis of the front steering wheels (not shown) and thereby enable the truck to make the turn without tire scuffing. Equally important is that the self-steering feature tends to hold the wheels in perfect alinement when travelling straight ahead. This self-steering action also takes place to some extent when a tendency to tire scuffing occurs because one wheel or a pair of wheels have a different diameter from the diameter of the wheel or pair of wheels at the other side of the same axle.

To restrain the unsprung components of the suspension against movement fore-and-aft of the vehicle and at the same time to provide a limited resilient resistance to such movement, the radius rods 86 are provided at each side of the vehicle. These radius rods extend lengthwise of the line of movement of the vehicle and each is connected at one end, through a rubber bushing 85 to a pivot pin 84 of a downward extension 83 of the corresponding frame bracket 66. The opposite ends of each of these radius rods 86 is connected, through a rubber bushing 87, to a pivot pin 88 fixed to a bracket 89 projecting forwardly from the corresponding end of the bolster 46.

It will therefore be seen that the movement of the unsprung components of the spring suspension fore-and-aft of the vehicle frame is limited by these radius rods 86 but that the rubber bushings 85 and 87 provide a degree of resilient resistance to this limiting action.

In similar manner, movement of the unsprung components of the tandem spring suspension transversely of the frame 25 is resisted by the transverse radius rod 140 in such manner as to cushion this restraining action. Thus this radius rod is connected to the frame bracket 148 through a rubber brushing 146 while its other end is connected to the bracket 142 rising from the bolster 46 through a rubber bushing 144. This radius rod thereby restrains the bolster 46 and its cross tube 34 against axial movement or laterally of the vehicle frame 25 but in a cushioned manner.

The torque arms 130 fixed to the axles 28, 29 adequately resist all brake and drive torque reactions and through the rod and rubber cushions 131, 132 and 134 do not resist axle movement in any direction.

By the high and wide mounting for the helical compression springs 61, 62 excellent sidesway control is achieved with a soft, low frequency ride which these springs provide.

The rubber bushings 35 for each walking beam 33 constitute an important feature of the invention, these rubber bushings being thick enough to wind up or flex torsionally in response to the oscillation of the walking beams, and this wind up or torsional stress in addition contributes to holding all four groups of wheels, and hence the unsprung weight of the suspension, on the road, particularly when travelling along without a load and at high speeds. A serious problem with heavy vehicles, when unladen, is to keep the wheels of the tandem axles on the road at high speeds. Often the unsprung weight is as great or greater than the sprung weight and under such conditions the main spring means between the tandem suspension as a whole and the vehicle frame are less effective in keeping the wheels, particularly individual wheels, on the road. The torsionally flexed rubber bushings 35 utilize the weight of the unsprung mass of the vehicle to hold the wheels on the road. As now practiced this is accomplished in an empty vehicle for high speed travel by chaining one axle up off the road and in that way making it a part of the sprung mass. This is accomplished by the stressed rubber bushings 35 as follows, when travelling unladen at high speed:

When one or two wheels 30 rise all the rubber bushings 35 are twisted or flexed against their internal resistance, and hence the upward movement of the rising wheels not only is not accelerated but instead is resiliently resisted by the bushings and the reactive force tends to return the rising wheel to contact with the road. These rubber bushings are a part of the unsprung mass and hence this resistance and reactive force of the rubber bushings is a function of the unsprung mass and is independent of both the main vertical cushioning springs and also the sprung mass which, as pointed out above, can be of very reduced effectiveness when empty in holding the wheels on the road. The torsionally flexed rubber bushings are equal or better than chaining one axle up and moreover are effective under all load conditions in holding all four groups of wheels to the road.

By "rubber" as used in the accompanying claims is meant natural rubber, synthetic rubber or mixtures of natural and synthetic rubber.

From the foregoing it will be seen that the present invention achieves the objects and has the advantages set forth, and provides a sturdy low cost suspension free from up-keep and service problems.

What is claimed is:

1. A tandem axle spring suspension adapted to be interposed between a vehicle frame and a pair of tandem axles each having rubber tired wheels journalled at the ends thereof, comprising a vertically movable bolster arranged under said frame between said axles and projecting outwardly from below the opposite sides of said vehicle frame, said bolster comprising a vertically thin and horizontally broad rigid body having end portions projecting between the tires of said wheels at each side of the frame, a cross rod fixed to the underside of said bolster generally parallel with said axles and having end portions arranged under and in vertically spaced relation to said end projecting portions of said bolster, a walking beam arranged at each side of said frame and extending lengthwise thereof and journalled at its center on and supporting the corresponding end portion of said cross rod, a frame bracket above each projecting end portion of said bolster, at least one vertical helical compression spring arranged outboard of the space directly above said walking beam and within the space directly between the tires of the wheels at each side of the frame and having its lower end seated on the corresponding end portion of said bolster and its upper end supporting the corresponding frame bracket, means connecting each end of each walking beam to a corresponding axle end in a vertical plane between said frame and wheels, and guide means operatively interposed between said frame and bolster and constraining said frame to move in a substantially vertical path.

2. In a tandem axle spring suspension adapted to be interposed between a vehicle frame and a pair of tandem axles each having rubber tired wheels journalled at the ends thereof, said spring suspension having a walking beam arranged at each side of said frame and extending lengthwise thereof, a vertically movable bolster extending transversely of and arranged under said frame between said axles and projecting outwardly from below said vehicle frame, a cross rod means fixed to said bolster with its axis generally parallel with said axles and having portions projecting from under opposite sides of said frame, bearing means journalling the central portion of each walking beam on the adjacent said portion of said cross rod means, spring means interposed between said frame and the ends of said bolster and yieldingly supporting said frame on said bolster ends, means connecting each end of each walking beam to a corresponding axle end in a vertical plane between said frame and wheels, and guide means operatively interposed between said frame and bolster and constraining said frame to move in a substantially vertical path the combination therewith of shock absorbing means, comprising a shock absorber mounting member on the outer end of each of said portions of said cross rod means outboard of said spring means and a shock absorber connecting each shock absorber mounting member with said frame.

References Cited in the file of this patent

UNITED STATES PATENTS

| | | |
|---|---|---|
| 2,111,184 | Hendrickson | Mar. 15, 1938 |
| 2,410,747 | Reid | Nov. 5, 1946 |
| 2,456,719 | Martin | Dec. 21, 1948 |
| 2,491,994 | McFarlane | Dec. 20, 1949 |
| 2,493,004 | Mackie | Jan. 3, 1950 |
| 2,743,939 | Reid | May 1, 1956 |
| 3,069,184 | Hickman | Dec. 18, 1962 |

OTHER REFERENCES

Autocar magazine, Sept. 11, 1959, page 194.